United States Patent [19]

Ueno et al.

[11] Patent Number: 5,098,750

[45] Date of Patent: Mar. 24, 1992

[54] COMPOSITE MOLDED ARTICLES AND METHOD THEREFOR

[75] Inventors: Susumu Ueno, Tokyo; Kin-ichi Okumura, Kamakura; Motoyuki Yamato, Naka, all of Japan

[73] Assignee: The B. F. Goodrich Company, Akron, Ohio

[21] Appl. No.: 563,234

[22] Filed: Aug. 6, 1990

[51] Int. Cl.⁵ .............................. B32B 3/26
[52] U.S. Cl. ........................ 428/304.4; 264/45.5; 264/46.4; 428/318.4; 428/319.7; 428/517; 428/521
[58] Field of Search ............ 264/45.5, 46.4; 428/304.4, 318.4, 319.7, 517, 521

[56] References Cited

U.S. PATENT DOCUMENTS 4,820,580 4/1989 Hocker et al. ............... 428/304.4

Primary Examiner—William J. Van Balen
Attorney, Agent, or Firm—Thoburn T. Dunlap

[57] ABSTRACT

This invention relates to a composite molded article where a polymer film of superior weather resistance, adhesion and surface smoothness is made into an integral composite body on the surface of polynorbornene base material by utilizing reaction injection molding in combination with an in-mold coating process. By means of this invention, it is possible to manufacture three dimensional composite molded articles, composite molded articles of complex shapes and deep-drawn composite molded articles. The composite molded articles of this invention can be used for a variety of purposes, such as automobile parts, electrical parts, construction, etc.

21 Claims, No Drawings

COMPOSITE MOLDED ARTICLES AND METHOD THEREFOR

BACKGROUND OF THE INVENTION

1. Technical Field

This invention relates to a method for manufacturing composite molded articles and to the articles obtained therefrom. In further detail, this invention pertains to a method for manufacturing a composite molded article comprising a surface film of superior weather-resistance integrally molded on a surface of a polynorbornene base material. The method is achieved via an in-mold coating process in combination with a reaction injection molding (RIM) process.

2. State of the Art

Polynorbornene derived molded articles obtained by bulk polymerization of norbornene monomers in a mold by RIM have recently received wide attention. However, painting and coating of such articles are necessary, particularly when these molded articles are used outdoors, because of their insufficient weathering properties.

However, in order to improve the surface of polynorbornene molded articles by painting, the article has to be thoroughly rinsed with solvent and warm water to remove the mold releasing agent and soil from handling, etc., that have deposited on the surface. The article is then submitted to a primer treatment and/or a paint treatment, etc. Consequently, the processes are complex and the procedure is difficult. Moreover, molded articles obtained by RIM generally present problems in that pin holes readily form in the paint film.

Polynorbornene polymers are usually yellow or brown in appearance. Even when they are colored by adding dyes, changes in color readily develop over time. Attempts have been made to improve the surface conditions of molded articles by lamination of colored sheets and printed sheets made from plastic, but adhesion with the norbornene polymer is often very poor. Therefore, a composite material for practical use has yet to be obtained.

Consequently, the present inventors filed a patent application (Application No. Sho 63(1988)-171038) for a composite material of a layer that is made from an olefinic polymer and/or hydrocarbon thermoplastic elastomer on a base that is made from a polynorbornene polymer. This composite material has superior properties in that it has good interface adhesion, the surface layer can be of any color, and it has improved weather resistance.

This composite material is manufactured by feeding a bulk polymerizable a reaction mixture containing a norbornene monomer and metathesis catalyst in a mold having a layerforming material made of an olefinic polymer on its inside surface. However, manufacture of molded articles of complex shapes and deep draw is difficult. In addition, surface-molding materials with good interface adhesion are limited.

On the other hand, the so-called in-mold coating method is well known as a method for painting thick RIM molded articles (Patent No. Sho 63(1988)-45291, Japanese Kokai Patent No. Sho 59(1984)-224328, etc.). By utilizing this method, many process steps are necessary. For instance, a releasing agent is applied to the inside of the mold, a urethane undercoat is then applied and dried, a urethane RIM material (reaction solution) is injected into the mold and reaction injection molding is performed so that the undercoat paint film is transferred onto the molded article. The paint film is hardened by post-curing after removal from the mold, the releasing agent is rinsed and removed from the paint film, and then another undercoat and a topcoat are applied. In another method, RIM material is injected and molded and then paint is injected into the mold under high pressure. However, special molds and facilities are needed.

Painted molded articles that are obtained by inmold coating have yet to be manufactured using RIM with norbornene monomers. The reason for this is that there is a chance that the paint will impair the polymerization of the norbornene monomer, adhesion between polynorbornene polymer and paint film is insufficient, and there are no paint film materials that transfer to the surface of the molded article.

SUMMARY OF THE INVENTION

It is a primary object of the present invention to provide a method for producing a weather resistant composite molded material comprising a ring-opened polynorbornene base or core material having a weather resistant polymer film material on its surface.

It is a further object of the present invention to provide a reaction injection molding (RIM) method for producing an integrally molded composite product having superior weatherability and surface smoothness.

It is still a further object of the present invention to provide a polymer composite having an integrally formed weather resistant surface film without the need for special adhesives.

These and other objects of the present invention are accomplished by applying a weather resistant film-forming polymer to the inside of a mold and subsequently feeding a bulkpolymerizable reaction solution comprising a norbornene monomer and a metathesis catalyst system, into the mold and polymerizing the norbornene monomer thereby forming in situ a polynorbornene base having an integrally bound weather resistant surface.

DETAILED DESCRIPTION OF THE INVENTION

The present inventors have performed intensive studies in order to solve the aforementioned problems. As a result, they discovered a composite molded article that is obtained by forming a surface film by applying a weatherresistant polymer capable of forming a film on the inside of a mold using a solvent or dispersant and then feeding a reaction solution for bulk polymerization that contains norbornene monomer(s) and a metathesis catalyst system, to the mold and polymerizing this solution in order to make the aforementioned film into an integral body with the polynorbornene base.

Moreover, they discovered a film that is superior in adhesion and is formed without using a special undercoating process.

BASE POLYMER

The base polymer or core of the composite molded articles of this invention is a polynorbornene polymer.

The molded article polymerized from norbornene monomers can be manufactured by the so-called RIM process whereby two or more materials of low viscosity are bulk polymerized to quickly form a polymer are mixed and then fed to the mold so that they polymerize inside the mold. For example, the preferred method for producing a polymer by bulk ringopening polymerization is to prepare two portions of a norbornene type monomer in separate containers in order to prepare two stable reaction solutions: one for a metathesis catalyst and the other for an activating (cocatalys) agent. These two solutions are mixed and then fed into a mold where bulk ring-opening polymerization occurs. As a result, a polynorbornene molded article is obtained.

Since injection pressure is much lower in molding of polynorbornene polymers by RIM compared to the injection molding of conventional thermoplastic resins, a lightweight, inexpensive mold can be used. Moreover, fluidity of the starting materials inside the mold is good. The bulk polymerization via RIM of norbornene monomers is preferred for manufacture of large molded articles and molded articles of complex shape.

Any norbornene monomer can be utilized as the base material in this invention, as long as it has a norbornene ring. Norbornene polymers that are manufactured using polycyclic norbornene monomers with three or more rings are particularly preferred. Satisfactory heat resistance for use in composite materials is obtained when norbornene monomers with three or more rings are employed because a polymer with a high heat deformation temperature is obtained. Moreover, the polymer that is produced by this invention can be a thermosetting polymer. In order to obtain a thermosetting polymer, the total monomer should consist of at least 10 wt %, preferably 30 wt % or more, of cross-linkable monomer.

Examples of the norbornene monomers are bicyclic monomers, such as norbornene and norbornadiene, tricyclic monomers, such as dicyclopentadiene, dihydrodicyclopentadiene, etc., tetracyclic monomers, such as tricyclopentadiene, etc., pentacyclic monomers, such as tricyclopentadiene, etc., heptacyclic monomers, such as tetracyclopentadiene, etc., their alkyl substituents (for instance, methyl, ethyl, propyl, and butyl substituents), alkenyl substituents (for instance, vinyl substituents), alkylidene substituents (for instance, ethylidene substituents), aryl substituents (for instance, phenyl, tolyl, and naphthyl substituents), etc. Of these, tricyclic, tetracyclic and pentacyclic monomers are preferred because they are easily obtained, and also because of their reactivity, heat resistance, etc.

The cross-linkable monomer is a polycyclic norbornene monomer that has two or more reactive double bonds. Actual examples are dicyclopentadiene, tricyclopentadiene, tetracyclopentadiene, etc. Consequently, it is not necessary to use special cross-linkable monomers when the cross-linkable monomer is the same as the norbornene monomer.

In addition, monocyclic cycloolefins, such as cyclobutene, etc., that can be polymerized via ring-opening with one or more of the aforementioned norbornene monomers can also be used within a given range, within which the purpose of this invention is not lost.

CATALYST SYSTEM

The catalyst that is employed can be any catalyst as long as it is a metathesis catalyst commonly employed as a catalyst for ring-opening polymerization of norbornene monomers. Actual examples are the metathesis catalysts of halides, oxyhalides, oxides, organic ammonium salts, etc., of tungsten, molybdenum, tantalum, etc. Examples of activators (cocatalysts) are alkyl aluminum halide, alkoxyalkyl aluminum halide, aryloxyalkyl aluminum halide, organotin compounds, etc.

The metathesis catalyst is normally used with a range of approximately 0.01 to 50 millimoles, preferably 0.1 to 10 millimoles, per 1 mole of norbornene monomer. The activator (cocatalyst) is used within a range of preferably 2 to 10 (molar ratio) per catalyst component.

It is preferred that the metathesis catalyst and activator be dissolved in the monomer. However, as long as it is within a range where there is essentially no loss of properties in the product, the catalyst and activator can also be suspended or dissolved in a trace of solvent.

MOLDING CONDITIONS

In the preferred method for manufacturing polynorbornene polymers, the norbornene monomer is divided into two solutions, which are then placed in separate vessels. A metathesis catalyst is added to one vessel, while activator is added to the other vessel so that two stable reaction solutions are prepared. These two reaction solutions are mixed and then injected into a mold or frame of the desired shape. Then ringopening polymerization by the bulk method is performed.

The mold temperature is normally 30° C. or more, preferably 40° to 200° C., and most preferably, 50° to 130° C. The components that are used in the polymerization reaction should be stored and used in an inert gas atmosphere, such as nitrogen.

The mold material can be metal, resin, wood, plaster, etc.

Additives such as antioxidants, fillers, reinforcers, foaming agents, dyes, coloring agents, elastomers, etc., can be added to the polynorbornene resin. These additives are normally dissolved or dispersed in the reaction solution, but there are cases where they are placed inside the mold.

Foaming agents can be added to the reaction solution, which is then injected into the mold, when the base material is to be a foam. Preferred foaming agents are usually liquids. Examples are organic compounds with low boiling points that easily evaporate, such as the hydrocarbons of pentane, hexane, etc., halogenated hydrocarbons such as methylene chloride, trichlorofluoromethane, dichlorodifluoromethane, etc., or an inert gas, such as nitrogen, argon, etc.

FILM FORMING SURFACE POLYMER

There are no particular restrictions to the weatherresistant polymer that is employed in this invention as long as it has better weather resistance than the base material, it has the ability to form a film, it does not inhibit hardening of the norbornene monomer, and its film is capable of forming an integral body with the base polynorbornene polymer.

Actual examples of this type of weather-resistant polymer are olefinic polymers, such as high-density polyethylene (PE), intermediate-density PE, low-density PE, ethylenepropylene copolymer, ethylene-butene-1 copolymer, polypropylene (PP), polybutene-1, polypentene-1, poly-4methylpentene-1, polystyrene, ethylene-propylene rubber (EPR), ethylene-propylene-diene 3-element copolymer (EPDM), etc.; copolymers with ester monomers whose main component is olefinic monomer, such as ethylene-vinyl acetate copolymer, ethylene-acrylic acid ester copolymer, etc.; ester polymers, such as polyvinyl acetate, polymethyl methacrylate, polyhexyl methacrylate, etc.; their chlorides, their mixtures, etc.

Moreover, various block copolymers made from vinyl aromatic compounds (typically, styrene (S)) and conjugated dienes, such as isoprene (I), butadiene (B), etc., for instance, S—I, S—B, S—I—S, S—B—S, S—I—S—I—S, etc., block copolymers; their hydrogenated products; unvulcanized rubber, such as polybutadiene, polyisoprene, styrene-butadiene copolymer, chloroprene rubber, butyl rubber, etc.; and hydrocarbon thermoplastic elastomers of their mixtures can be given. These hydrocarbon thermoplastic elastomers can be used by being mixed at any ratio with the aforementioned olefinic polymers, etc.

Of these polymers, olefinic polymers, ester polymers, etc., are particularly preferred in terms of weather resistance, transfer and adhesion with the substrate, smoothness of the film surface, etc.

In addition, it is possible to color these polymers while improving weather resistance by adding fillers, such as titanium oxide, calcium carbonate, aluminum hydroxide, talc, carbon black, etc., coloring agent, such as various dyes and pigments, etc., antioxidants, ultraviolet ray absorbers, anti-dust agents, antistatic agents, adhesion improvers, such as petroleum resins, etc.

MOLDING METHOD

By means of the method for manufacturing composite molded articles of this invention, a film of a weatherresistant polymer is formed on the inside surface of a mold and then a reaction solution for bulk polymerization comprising norbornene monomer and metathesis catalyst system is fed and hardened inside the mold.

The weather-resistant polymer is dissolved or dispersed in solvent or dispersant (both are called "solvent" below) with the optional improving agents and then this is applied to the inside of the mold by spraying or brushing in order to form a film. The temperature of the mold is between room temperature and 150° C. and should be kept at the temperature used to mold polynorborene resins.

Examples of suitable solvents are water; alcohols, such as methanol, isopropyl alcohol, etc.; esters, such as ethyl acetate, etc.; ketones, such as methyl ethyl ketone, cyclohexanone, etc.; hydrocarbons, such as benzene, toluene, hexane, ethylidene norbornene, dicyclopentadiene, etc.

Any thickness of film can be selected. However, it is generally 5 to 500 $\mu$m, preferably 10 to 200 $\mu$m, and most preferably 20 to 60 $\mu$m.

Although it is preferred that a releasing agent be spread on the inside of the mold before applying the filmforming material in order to provide good conditions for finishing of the surface of the composite molded article, it is not always necessary to do so. Examples of the releasing agent are silicon oil, fluorinated compounds, such as hexafluoropropane oligomer, etc., wax, etc.

After a film has been formed on the inside of the mold, the norbornene monomer that is used in polymerizing the base is molded by conventional RIM by feeding and hardening the reaction solution inside the mold. The feeding method can be a method whereby two or more reaction solutions are instantaneously mixed within the RIM mixing head and then injected into a mold at a high temperature, or a method whereby when the reaction solution has long pot life, the solutions are mixed with a mixer and when mixing is completed, they are injected into a preheated mold all at once or in several batches. When necessary, these operations are performed in an inert gas atmosphere. Pressure inside the mold is from atmospheric pressure to 50 kg/cm$^2$, preferably 0.1 to 5 kg/cm$^2$.

When the mold is opened and the article is removed after polymerization is completed, a composite molded article of film transferred to base is obtained.

By means of the manufacturing method of this invention it is possible to easily manufacture three-dimensional composite molded articles or composite molded articles of complex shapes where a film of a weather-resistant polymer adheres firmly at the interface.

In the prior art method whereby layer-forming materials that have been molded into specific shapes by vacuum molding, such as films and sheets, etc., are placed inside molds for reaction injection molding, complex operations are used for removing the layer-forming material from the first mold and placing it inside the RIM mold. Moreover, when the layer-forming material is thin, creases easily form on the surface. However, by means of the method of this invention, it is possible to manufacture composite molded articles at good productivity without these types of problems.

Moreover, only materials of good interface adhesion can be used for methods that use films and sheets. However, by means of the method of this invention, it is possible to obtain composite molded articles of good transfer properties and adhesion using a variety of polymer films.

Furthermore, composite molded articles of good appearance can be easily obtained without using the many complicated processes of undercoating and top-coating, etc. These articles have few defects, such as pin holes, and surface roughness and discoloration are prevented.

The composite molded articles of this invention can be used as automobile parts, electrical parts, construction panels, etc.

The following examples will show one skilled in the art how to operate within the scope of the present invention and are not intended to serve as a limitation on the scope hereof. In these examples, all parts are parts by weight and all percentages are percentages by weight unless otherwise indicated.

PROPERTY EVALUATION METHODS

The following evaluation methods were utilized in evaluating the properties of the molded composites set forth in the examples.

DuPont impact test: In accordance with JIS K7211, the breaking strength when a weight with an end with a radius of 7.9 mm was dropped from back of the molded article, that is the opposite side from the film surface, was determined.

Transfer properties: Formation of film on the base resin was observed with the naked eye and quality was evaluated.

Film residue: Film residue on the inside of the mold was observed with the naked eye and quality was evaluated.

Adhesion: Adhesion was evaluated by checkerboard tests. By means of the checkerboard test, 11 vertical and horizontal cuts were mae at intervals of 1 mm in the surface of a base on which a film was molded using a cutter knife to obtain a checkerboard pattern. Then adhesive tape was applied and the condition of the checkerboard made by the remaining film when the tape was quickly peeled was observed. This was evaluated in the following 4 stages:

*: none of the checkerboard peeled off
O: less than 50% peeled off
☐: 50% or more peeled off
X: adhesion of film poor, completely peeled off Surface Smoothness: The film surface was observed with the naked eye and evaluated in the following three stages:
*: smooth
O: a few bumps
X: rough

EXAMPLE 1

A 10% toluene solution of ethylene-vinyl acetate copolymer (6% vinyl acetate, brand name of Ultracene 530 made by Tosoh Corp.) was prepared. After silicon oil releasing agent was sprayed on the inside of a mold half with a stainless steel surface and a molding area of 20×20 cm that had been adjusted to 70° C., the aforementioned solution was sprayed and the toluene was evaporated to form a film.

This mold half and another untreated mold half were sandwiched with a 3 mm-thick spacer in between to form a space of 20 cm×20 cm×3 mm. A reaction solution for bulk polymerization was injected into this space. The mold temperature was kept at 70° C.

The reaction solution for the bulk polymerization that was used was a mixture of the following solution A and solution B.

A solution prepared by adding and mixing 6.5 parts of styrene-isoprene-styrene block copolymer (SIS; brand name of Quintack 3421 made by Nippon Zeon) with 100 parts of dicylcopentadiene (DCP) was placed in two vessels. Diethyl aluminum chloride (DEAC), n-propyl alcohol, and silicon tetrachloride were added to one vessel to concentrations of 41 millimoles, 41 millimoles, and 20 millimoles per DCP, respectively (solution A). Tri(tridecyl)ammonium molybdate was added to the other vessel to a concentration of 10 millimoles per DCP. Then 4 parts of phenol antioxidant (brand name of Etanox 702 made by Ethyl Corporation) per 100 parts of DCP was added (solution B).

The reaction solutions (mixed ratio of solution A:solution B=1:1) were quickly injected into the aforementioned mold at approximately normal pressure using a gear pump and powder mixer.

The mold was opened three minutes after injection and the molded article was removed. A film of ethylene-vinyl acetate copolymer with good transfer properties had formed on one side of the molded article. Thickness of the film was approximately 30 μm. No film remained on the inside of the mold and clean surface was obtained.

When evaluated by standard tests, adhesion of the film on the molded article was good*. Moreover, smoothness of the film surface was good*.

DuPont impact tests were performed after exposure of the molded article to a sunshine weatherometer for 60 hours. This value was 110 kgf cm while the value of the molded article without the ethylene-vinyl acetate surface portion was 50 kgf cm. Therefore, it is clear that weather resistance of composite molded articles of this invention is improved.

EXAMPLE 2

Composite molded articles were manufactured as in Example 1, with the exception that the film material, solvent and application method in Example 1 were changed as shown in Table 1.

| | Formation of film | | | Transfer property of film to resin | Film residue on mold surface | Film properties | |
|---|---|---|---|---|---|---|---|
| Example | Film material (weather-resistant polymer) | Solvent | Application Method | | | Adhesion | Surface smoothness |
| 2-1 | Polyethylene (low-density) (Tosoh Corp., brand name of Petrocene 248) | Toluene | Sprayed | Good | None | • | • |
| 2-2 | Polyvinyl acetate emulsion (Konishi Co., grade CH18) | Water | Brushed | Good | None | • | • |
| 2-3 | Denaturated polyolefin (Mitsui Petrochemical Industries, brand name of Unistol P) | Toluene | Sprayed | Good | None | • | • |
| 2-4 | Acrylic resin (Konishi Co., grade KP1000) | Ethyl acetate | Brushed | Good | None | o | • |
| 2-5 | Chlorinated polypropylene (Sanyo-Kokusaku Pulp Co., grade 803L) | Toluene | Sprayed | Good | None | o | o |
| 2-6 | Chloroprene (Konishi Co., grade G18) | Toluene | Sprayed | Somewhat good | Trace | ■ | o |
| 2-7 | Polystyrene (Sanyo Kasei, Himer ST-120) | Toluene | Sprayed | Good | None | • | o |
| 2-8 | Styrene-isoprene-styrene block copolymer (Nihon Zeon, Quintack 3421) | Toluene | Sprayed | Somewhat good | Trace | o | o |
| 2-9 | Polyvinyl chloride (Konishi, grade V23) | Methyl ethyl ketone | Sprayed | Somewhat good | Trace | o | o |
| 2-10 | 2:1 blend of acrylic resin (same as Example 2-4) and polystyrene (Example 2-8) | Toluene | Sprayed | Good | None | o | • |

EXAMPLE 3

A composite molded article was manufactured as in Example 1, with the exception that 2-(5-methyl-2-hydroxyphenyl)benzotriazole (Japan Ciba Geigy, brand name of Tinuvin P) was added as the ultraviolet ray absorber to the toluene solution of the ethylene-vinyl acetate copolymer in Example 1 to obtain an 0.05% toluene solution.

A film with good transfer properties was formed on one side of the molded article. No film residue was deposited inside the mold and the mold surface was clean. When adhesion of the film was evaluated by checkerboard tests, it was good ( • ) and smoothness of the film was also good ( • ). Moreover, the film containing ultraviolet ray absorber and therefore, weather resistance was improved even further.

EXAMPLE 4

A composite molded article as manufactured as in Example 1, with the exception that the ethylene-vinyl acetate copolymer in Example 1 was changed to ethylene chloride-vinyl acetate copolymer (chlorine content of 27%, Sanyo-Kodudaku Pulp Co.) and 1% of Kinakudorin (red pigment) was dispersed in this copolymer.

A film of good transfer properties formed on one side of the molded article. Moreover, no film residue was deposited inside the mold and the mold surface was clean. Adhesion of the film was also good and smoothness was good.

What is claimed is:

1. A method for the production of an integrally formed composite having a base portion and a weather-resistant surface portion comprising: forming a polymer film surface portion on the inside surface of a mold; feeding into the mold a bulk-polymerizable liquid reaction mixture comprising at least one norbornene monomer, a metathesis catalyst, and a cocatalyst; polymerizing said reaction mixture thereby forming a base portion and wherein said base portion becomes integrally adhered to said surface portion thereby forming an integrally formed composite; and removing said composite from the mold.

2. The method of claim 1 wherein the mold is coated with a releasing agent.

3. The method of claim 1 wherein a reinforcing agent is placed in the mold prior to the introduction of said liquid reaction mixture.

4. The method of claim 1, wherein the mold is heated to a temperature of about 30° C. to about 200° C.

5. The method of claim 1 wherein the reaction mixture further comprises an additive selected from the group consisting of antioxidants, fillers, reinforcing agents, foaming agents, dyes, pigments, elastomers, and mixtures thereof.

6. The method of claim 1 wherein the norbornene monomer is selected from the group consisting of bicyclic monomers, tricyclic monomers, tetracyclic monomers, pentacyclic monomers, heptacyclic monomers and mixtures thereof.

7. The method of claim 6 wherein the norbornene monomer is selected from the group consisting of norbornene, norbornadiene, dicyclopentadiene, dihydrodicyclopentadiene tetracyclododecene, tricyclopentadiene, tetracyclopentadiene, including the alkyl, alkenyl, alkylidenyl and aryl substituents thereof.

8. The method of claim 1 wherein the reaction mixture further comprises monocyclic cycloolefins with the proviso that said cycloolefins can be polymerized via ring-opening polymerization with a norbornene monomer.

9. The method of claim 1 wherein the surface film polymer is selected from the group consisting of high-density polyethylene, intermediate-density polyethylene, low-density polyethylene, ethylene-propylene copolymer, ethylene-butene-1copolymer, polypropylene, polybutene-1, polypentene-1, poly-4-methylpentene-1, polystyrene, ethylene-propylene rubber, ethylene-propylene-diene 3-element copolymer, ethylene-vinyl acetate copolymer, ethylene-acrylic acid ester copolymer, polyvinyl acetate, polymethyl methacrylate, polyhexyl methacrylate block copolymers of S—I, S—B, S—I—S, S—B—S, S—I—S—I—S, and their hydrides; polybutadiene, polyisoprene, styrenebutadiene copolymer, chloroprene rubber, butyl rubber, and mixtures thereof.

10. The method of claim 1, wherein the surface film contains additives selected from the group consisting of fillers, pigments, dyes, antioxidants, anti-static agents, anti-dust agents, adhesion improvers, and mixtures thereof.

11. A molded composite article comprising a base portion having an integrally formed weather resistant surface layer said base portion comprising at least one norbornene monomer bulk polymerized in intimate contact with a surface of a weather resistant film.

12. The article of claim 11 wherein the norbornene monomer is selected from the group consisting of bicyclic monomers, tricyclic monomers, tetracyclic monomers, pentacyclic monomers, heptacyclic monomers and mixtures thereof.

13. The article of claim 12 wherein the norbornene monomer is selected from the group consisting of norbornene, norbornadiene, dicyclopentadiene, dihydrodicyclopentadiene tetracyclododecene, tricyclopentadiene, tetracyclopenetadiene, including the alkyl, alkenyl, alkylidenyl and aryl substituents thereof.

14. The article of claim 11 wherein the base portion contains an additive selected from the group consisting of antioxidants, fillers, reinforcing agents, foaming agents, dyes, pigments, elastomers, and mixtures thereof.

15. The article of claim 11 wherein the base portion is a polynorbornene foam.

16. The article of claim 11 wherein the surface layer comprises a polymer selected from the group consisting of high-density polyethylene, intermediate-density polyethylene, low-density polyethylene, ethylene-propylene copolymer, ethylene-butene-1copolymer, polypropylene, polybutene-1, polypentene-1, poly-4-methylpentene-1, polystyrene, ethylene-propylene rubber, ethylene-propylene-diene 3-element copolymer, ethylene-vinyl acetate copolymer, ethylene-acrylic acid ester copolymer, polyvinyl acetate, polymethyl methacrylate, polyhexyl methacrylate block copolymers of S—I, S—B, S—I—S, S—B—S, S—I—S—I—S, and their hydrides; polybutadiene, polyisoprene, styrenebutadiene copolymer, chloroprene rubber, butyl rubber, and mixtures thereof.

17. The article of claim 16 wherein the surface layer comprises additives selected from the group consisting of fillers, pigments, dyes, antioxidants, anti-static agents, anti-dust agents, adhesion improvers, and mixtures thereof.

18. The method of claim 9 wherein the surface film polymer is an olefin or an ester.

19. The method of claim 1 wherein the surface film is 5 to 500 μm thick.

20. The article of claim 16 wherein the surface film polymer is an olefin or an ester.

21. The article of claim 11 wherein the surface film polymer is 5 to 500 μm thick.

* * * * *

UNITED STATES PATENT AND TRADEMARK OFFICE
CERTIFICATE OF CORRECTION

PATENT NO. : 5,098,750

DATED : March 24, 1992

INVENTOR(S) : Susumu Ueno, Kin-ichi Okumura, and Motoyuki Yamato

It is certified that error appears in the above-identified patent and that said Letters Patent is hereby corrected as shown below:

Column 2, line 37, "bulkpolymerizable" should read --bulk-polymerizable--.

Column 2, line 50, "weatherresistant" should read --weather-resistant--.

Column 3, line 2, "ringopening" should read --ring-opening--.

Column 3, line 6, "(cocatalys)" should read --(cocatalyst).

Column 3, line 36, "tricyclopentadiene" should read --tetracyclododecene--.

Column 4, line 22, "ringopening" should read --ring-opening--.

Column 4, line 47 "weatherresistant" should read --weather-resistant--.

Column 5, line 26, "weatherresistant" should read --weather-resistant--.

UNITED STATES PATENT AND TRADEMARK OFFICE
CERTIFICATE OF CORRECTION

PATENT NO.   : 5,098,750
DATED        : March 24, 1992
INVENTOR(S)  : Susumu Ueno, Kin-ichi Okumura, and Motoyuki Yamago It is certified that error appears in the above-indentified patent and that said Letters Patent is hereby corrected as shown below:

Column 5, line 51, "filmforming" should read --film-forming--.

Column 6, line 62, "mae" should read --made --.

Column 7, line 20, "forma" should read --form a --.

Column 10, line 1, "styrenebutadiene" should read --styrene-butadiene --.

Column 10, line 45, "styrenebutadiene" should read ==styrene-butadiene--.

Signed and Sealed this

Twenty-eighth Day of December, 1993

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,098,750
DATED : March 24, 1992
INVENTOR(S) : Susumu Ueno, et. al.

It is certified that error appears in the above-indentified patent and that said Letters Patent is hereby corrected as shown below:

On the Title page, item [73], Assignee: should read--Nippon Zeon Co., Ltd., Tokyo, Japan--.

Signed and Sealed this

Twenty-sixth Day of April, 1994

Attest:

BRUCE LEHMAN

Attesting Officer     Commissioner of Patents and Trademarks